April 7, 1959
J. L. JENSEN
2,881,332
CONTROL APPARATUS
Filed Nov. 17, 1954
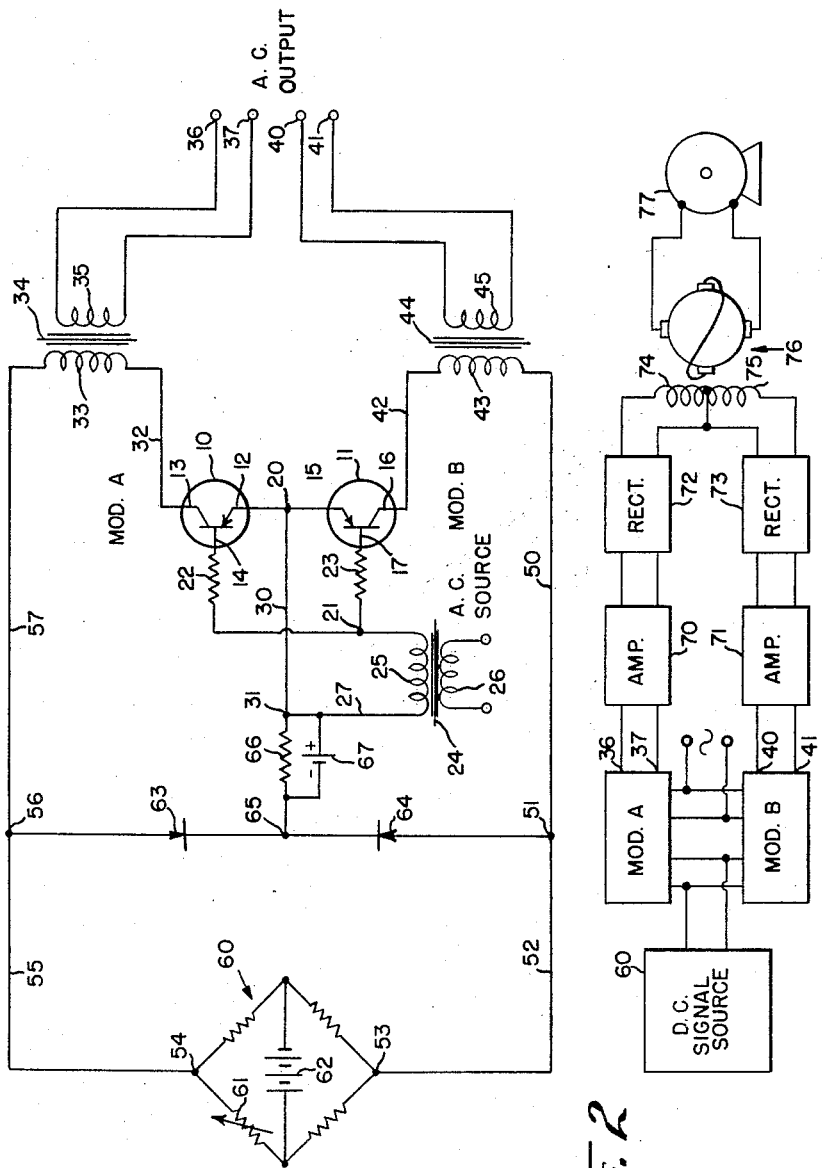
INVENTOR.
JAMES L. JENSEN
BY *Frederick E. Lange*
ATTORNEY

United States Patent Office 2,881,332
Patented Apr. 7, 1959

2,881,332

CONTROL APPARATUS

James Lee Jensen, St. Louis Park, Minn., assignor to Minneapolis-Honeywell Regulator Company, Minneapolis, Minn., a corporation of Delaware Application November 17, 1954, Serial No. 469,359

4 Claims. (Cl. 307—88.5)

The present invention relates generally to transistor control apparatus for converting a D.C. control signal of variable amplitude and reversible polarity to corresponding A.C. output signals of variable amplitude to be amplified for energizing a controlled device. The invention also relates to a novel transistor modulator circuit having a D.C. signal source and a two channel A.C. output circuit.

An object of the invention is to provide a transistor control apparatus for converting a D.C. control signal to A.C., amplifying it and using the amplified signal to selectively energize a controlled device.

Another object of the invention is to provide a transistor modulator for converting D.C. signals to A.C.

Another object of the invention is to provide a two-channel modulator for converting a D.C. signal to A.C. in one of two channels depending on the polarity of the D.C. signal.

These and other objects of the present invention will be understood upon consideration of the accompanying specification, claims and drawing of which:

Figure 1 of the drawing is a schematic diagram of an embodiment of the invention and, Figure 2 is a diagrammatic showing of a control system comprising the invention.

Referring first to Figure 2 there is shown a block diagram of a control system a portion of which is shown in more detail in Figure 1. A source of D.C. control potential 60 produces an output potential of varying magnitude and reversible polarity dependent on a condition. The D.C. control potential is fed to transistor modulators A and B which are controlled by an A.C. reference potential, and one or the other of the modulators produces an A.C. output depending on the polarity of the D.C. signal potential, as will be explained in detail later. The output potential of modulator A is connected to an A.C. amplifier 70, which may be of any suitable type, and which is further connected to a rectifier circuit 72. The rectified output of rectifier 72 is proportional in magnitude to the output of the modulator. Similarly the output circuit of modulator B is connected to an A.C. amplifier 71 which is further connected to a rectifier circuit 73. The output terminals of rectifiers 72 and 73 are connected to field windings 74 and 75 of an amplidyne generator 76. The amplidyne generator is driven at a constant speed by a motor, not shown, and the output terminals of the generator are connected to a D.C. motor 77.

A control signal of one polarity or the other from source 60 provides an output from one rectifier or the other to energize one of the field windings. The amplidyne generator produces a D.C. output of reversible polarity dependent on the field winding energized, to cause the D.C. motor 77 to run in one direction or the opposite.

Referring now to Figure 1 there is shown the two-channel modulator comprising a pair of transistors 10 and 11 which are shown as PNP junction type transistors. Other suitable types of transistors may be used if desired by observing the proper circuit parameters. Transistor 10 has an emitter electrode 12, a collector electrode 13, and a base electrode 14. Transistor 11 has an emitter electrode 15, a collector electrode 16 and a base electrode 17. The two emitters are connected together at a junction 20. Base electrodes 14 and 17 are connected together at a junction 21 through current limiting resistors 22 and 23 respectively. A transformer 24 has a secondary winding 25 which has one end connected directly to junction 21 and the opposite end of the winding connected to the emitters through a conductor 27, a junction 31, a conductor 30, and the junction 20. A primary winding 26 of transformer 24 is connected to any suitable source of alternating reference potential, which may be, for example, a transistor oscillator. The alternating potential developed in the secondary winding 25 acts to vary the bias between base and emitter electrodes to control the conduction of the transistors from a conducting to a nonconducting state at a rate equal to the frequency of the A.C. reference potential. Collector electrode 13 is connected by means of a conductor 32 to the lower end of a primary winding 33 of an output transformer 34. Transformer 34 also includes a secondary winding 35 which is connected to a pair of output terminals 36 and 37. Collector electrode 16 is connected by means of a conductor 42 to the upper end of a primary winding 43 of an output transformer 44. Transformer 44 also includes a secondary winding 45 which is connected to a pair of output terminals 40 and 41. The lower end of the winding 43 is connected through a conductor 50, a junction 51, and a conductor 52 to an output terminal 53 of a conventional D.C. bridge circuit. Another output terminal 54 of the bridge circuit is connected through a conductor 55, a junction 56 and a conductor 57 to the upper end of the winding 33. The D.C. bridge circuit is a conventional type having three legs of fixed resistance and a fourth leg 61 whose resistance varies with a condition, such as a temperature responsive resistor. A battery 62 or other suitable source of direct current is connected to energize the bridge. A pair of rectifiers 63 and 64 are connected in a series opposing circuit across the bridge between the junctions 51 and 56. A junction 65 between the rectifiers is connected to the emitters 12 and 15 of the transistors through a resistor 66, the junction 31 and the conductor 30.

In operation the circuit is a two-channel D.C. to A.C. converter supplying an A.C. output from one channel when the signal potential is of one polarity and supplying an A.C. output from the second channel when the polarity of the signal potential is reversed. Assume a bridge unbalance in a direction to make bridge terminal 54 positive with respect to terminal 53. A D.C. current then flows through conductor 55, rectifier 63, junction 65, resistor 66, conductor 30, emitter to collector of transistor 11, conductor 42, output winding 43, and conductors 50 and 52 back to terminal 53. Substantially no current flows through winding 33 and transistor 10 since the potential applied is the wrong polarity for this transistor. The source of alternating current applied across the base and emitter electrodes causes the transistors to be biased continuously from a conducting to a relatively nonconducting state and back so that the D.C. current previously described is actually a pulsating current. It can be seen that when the left end of winding 25 is instantaneously positive the emitters 12 and 15 are positive with respect to the base electrodes 14 and 17 so that the transistors are biased to conduct easily while on the second half of the reference cycle when the left end of winding 25 is negative the base electrodes will be positive with respect to the emitters and the transistors will be substantially cut off, thus converting the D.C. error signal from the bridge to a modulated current. The magnitude of the A.C. output current from secondary winding 45 is proportional to the amount of bridge unbalance.

Now let us assume conditions have changed so that resistor 61 increases in value making terminal 53 positive with respect to terminal 54. Current then flows from terminal 53 through conductor 52, junction 51, rectifier 64, junction 65, resistor 66, conductor 30, emitter to collector of transistor 10, conductor 32, output transformer winding 33 and conductors 57 and 55 back to terminal 54 of the bridge. The alternating reference potential applied across emitter and base of transistor 10 converts the D.C. current to a pulsating current which appears as an A.C. output from secondary winding 35 to output terminals 36 and 37. Thus a bridge unbalance of one polarity produces an A.C. output on one channel, a bridge unbalance of the opposite polarity produces an A.C. output in the other channel, and the A.C. output is proportional to the amount of bridge unbalance. When the bridge is balanced no D.C. current flows and the A.C. output is reduced to zero. Under certain conditions the A.C. output may not reduce completely to zero with a balanced bridge since the reference potential tends to cause a current to flow from emitter to base of the transistors which results in a potential drop across the transistor. A small collector current may flow through the output winding, the rectifier and the resistor back to the emitter. A relatively small D.C. potential applied across resistor 66 in a direction to oppsose the null current flow will reduce the null current to zero. This potential has been shown as a battery 67 for convenience of explanation, however, a voltage divider arrangement could be provided to permit adjustment of the potential applied to the circuit to provide compensation for circuit unbalance.

Many changes and modifications of this invention will undoubtedly occur to those who are skilled in the art and I therefore wish it to be understood that I intend to be limited by the scope of the appended claims and not by the specific embodiment of my invention which is disclosed for the purpose of illustration only.

I claim as my invention:

1. Semiconductor modulator means comprising: a direct current signal source of variable magnitude and reversible polarity having a pair of output terminals; first and second rectifiers each having a cathode terminal and an anode terminal, said cathode terminals being connected together; means connecting one of said anode terminals to each of said output terminals; first and second transistors each having an input circuit and an output circuit; a pair of output transformers, each of said transformers respectively being electrically connected to an output circuit; circuit means including said transformers connecting the output circuit of said first transistor to the terminals of said first rectifier and connecting the output circuit of said second transistor to the terminals of said second rectifier, so that the current flowing in the output circuit of said first and second transistors flows through the respective transformer windings; and means connecting a source of alternating current reference potential to said input circuits of said transistors in an in-phase relationship so that the reference potential biases both transistors simultaneously to a like condition of conductivity to continuously vary the bias applied to said transistors whereby said transistors are switched from a conductive to a relatively nonconductive state.

2. Semiconductor modulator means comprising: a source of direct current potential for energizing said modulator means, said source being of variable magnitude and reversible polarity, and having a pair of output terminals; first and second asymmetrically conducting devices each having a cathode terminal and an anode terminal; conductive means connecting together said cathode terminals; means connecting one of said output terminals to the anode terminal of said first device and connecting the second of said output terminals to the anode terminal of said second device; first and second semiconductor amplifying means each having an input circuit and an output circuit; first and second output means, said first and second output means being connected respectively to the output circuits of said first and second semiconductor means; circuit means including said output means connecting the output circuit of said first semiconductor means to the terminals of said first asymmetrically conducting devices and connecting the output circuit of said second semiconductor means to the terminals of said second asymmetrically conducting device; and means connecting a source of alternating current reference potential to said input circuits of said semiconductor means in an in-phase relationship so that the reference potential biases both semiconductor means simultaneously to a like condition of conductivity to continuously vary the bias applied to said means thereby changing the conductivity of said semiconductor means from a conductive to a relatively non-conductive state.

3. Transistor modulator means comprising: first and second transistors, each of said transistors having a plurality of electrodes including a collector electrode, an emitter electrode, and a base electrode; means connecting a reference alternating current as an alternating bias between said emitter electrode and said base electrode of each of said transistors, said alternating current reference being connected in-phase to both of said transistors so that the alternating current biases both transistors simultaneously to the same condition of conductivity; first and second output means connected respectively to the collector electrodes of said first and second transistors; means directly connecting together said emitter electrodes; a source of D.C. signal potential of variable magnitude and reversible polarity having first and second output terminals; circuit means including said output means connecting the first of said output terminals to the first of said collector electrodes and the second of said output terminals to the second collector electrode; a pair of unidirectional current conducting devices connected in series opposing relation across said D.C. signal source terminals; and means connecting the common junction between said unidirectional devices to said emitter electrodes so that a signal potential of one polarity flows through a first of said unidirectional conducting devices, said first transistor and said first output means while a signal potential of the opposite polarity flows through a second of said unidirectional conducting devices, said second transistor and said second output means, to produce an alternating type current in said first or second output means of a magnitude dependent upon the polarity and magnitude of said direct current signal potential.

4. Semiconductor modulator apparatus comprising: a direct-current reversible-polarity signal source having a pair of signal terminals; first and second semiconductor amplifying devices each having a plurality of electrodes including a pair of output electrodes and a control electrode; first transformer output means having a primary winding, said primary winding directly interconnecting the first of said signal terminals to the first output electrode of said first semiconductor amplifying device; second transformer output means having a primary winding, said primary winding directly interconnecting the second of said signal terminals to the first output electrode of said second semiconductor amplifying device; means directly connecting together the second output electrode of said first and second semiconductor amplifying devices; first and second asymmetric current conducting devices, said asymmetric current conducting devices being connected in series in opposing relation across said signal terminals; means connecting the junction of said asymmetric current conducting devices to the second output electrode of said first and second semiconductor amplifying devices; and alternating current reference potential means, one terminal of said reference potential means being connected to said second output electrodes, the other terminal of said alternating current reference potential means being connected to the control electrode of said first and second semiconductor amplifying devices so that the same phase of alternating current reference is simultaneously applied to said first and second semiconductor devices, said devices being rendered alternately conductive and nonconuctive by said alternating current reference potential; said asymmetrical current conducting devices being effective to direct the signal current flow through the first of said semiconductor devices and said first load means when the signal is of a first polarity, and to direct the signal current through the second of said semiconductor devices and said second output transformer when the signal is of the opposite polarity.

References Cited in the file of this patent

UNITED STATES PATENTS

| | | |
|---|---|---|
| 2,534,801 | Siltamki | Dec. 19, 1950 |
| 2,535,147 | Markusen | Dec. 26, 1950 |
| 2,594,015 | Halter | Apr. 22, 1952 |
| 2,626,767 | Bromley | Jan. 27, 1953 |
| 2,698,392 | Herman | Dec. 28, 1954 |
| 2,748,274 | Pearlman | May 29, 1956 |
| 2,774,021 | Ehret | Dec. 11, 1956 |
| 2,783,384 | Bright et al. | Feb. 26, 1957 |